US012458566B1

(12) United States Patent
Shao

(10) Patent No.: US 12,458,566 B1
(45) Date of Patent: Nov. 4, 2025

(54) MASSAGER

(71) Applicant: Shenzhen Hijoy Technology Co., Ltd., Shenzhen (CN)

(72) Inventor: Zhubiao Shao, Shenzhen (CN)

(73) Assignee: Shenzhen Hijoy Technology Co., Ltd., Shenzhen (CN)

( * ) Notice: Subject to any disclaimer, the term of this patent is extended or adjusted under 35 U.S.C. 154(b) by 0 days.

(21) Appl. No.: 19/193,868

(22) Filed: Apr. 29, 2025

(30) Foreign Application Priority Data

Apr. 8, 2025 (CN) ......................... 202520642729.2

(51) Int. Cl.
*A61H 19/00* (2006.01)
*A61H 23/02* (2006.01)

(52) U.S. Cl.
CPC . *A61H 23/0254* (2013.01); *A61H 2201/1215* (2013.01); *A61H 2201/14* (2013.01); *A61H 2201/1436* (2013.01); *A61H 2201/1669* (2013.01); *A61H 2201/1671* (2013.01)

(58) Field of Classification Search
CPC ............ A61H 19/32; A61H 2201/1215; A61H 2201/149; A61H 2201/1669; A61H 2201/1671; A61H 2205/087
See application file for complete search history.

(56) References Cited

U.S. PATENT DOCUMENTS

| | | | | |
|---|---|---|---|---|
| 12,329,709 | B1 * | 6/2025 | Wang | A61H 19/44 |
| 2021/0186798 | A1 * | 6/2021 | Tang | A61H 19/32 |
| 2023/0126338 | A1 * | 4/2023 | Shao | A61H 15/0078 600/38 |
| 2023/0210718 | A1 * | 7/2023 | Zhou | A61H 19/32 600/38 |
| 2023/0277408 | A1 * | 9/2023 | Luo | A61H 15/0078 601/84 |
| 2023/0355466 | A1 * | 11/2023 | Cheng | A61F 7/007 |
| 2025/0052303 | A1 * | 2/2025 | Wu | F16M 11/18 |
| 2025/0161148 | A1 * | 5/2025 | Wang | A61H 19/30 |
| 2025/0213422 | A1 * | 7/2025 | Wang | A61H 19/34 |

FOREIGN PATENT DOCUMENTS

EP 4559449 A2 * 5/2025 ............. A61H 7/007

OTHER PUBLICATIONS

English translation of Watanabe et al. (CN 109106401 A) (Year: 2019).*
English translation of DE 202024103084 U1 (Year: 2024).*

* cited by examiner

*Primary Examiner* — Justine R Yu
*Assistant Examiner* — Christopher E Miller

(57) ABSTRACT

The present disclosure relates to a massager, comprising a main body, a power mechanism and a linear reciprocating mechanism mounted on the main body, wherein the power mechanism drives the linear reciprocating mechanism to reciprocate linearly; the main body comprises a massage chamber, wherein the massage chamber is provided with a flexible massage mechanism for accommodating an inserted part of human body, and the linear reciprocating mechanism drives the flexible massage mechanism to reciprocate and rotate to massage the inserted part of human body, so as to provide better massage effect and massage comfort.

16 Claims, 12 Drawing Sheets

MASSAGER

RELATED APPLICATIONS

The present application claims the benefit of priority of Chinese Patent Application No. 202520642729.2, filed Apr. 8, 2025, and entitled "A MASSAGER," the entire content of which is incorporated herein by reference.

TECHNICAL FIELD

The present disclosure relates to the technical field of massager, and in particular, to a massager.

BACKGROUND

Massagers are mainly used to massage local parts of human body to relieve physical fatigue for physical and mental relaxation. Existing massagers are usually designed with motors and transmission mechanisms to realize rotation, extension and retraction of the massage part, thereby massaging a certain part of human body. However, during actual massage, it may be impossible for some parts of human body to be further inserted into the massager due to their relative positions, and simple rotating or retracting massage is mainly used for the inserted part. For existing massagers, when the above functions are integrated, the single motor can realize only one of the above functions, resulting in low massage comfort of human body during actual massage. Therefore, it is necessary to improve the comfort and combination of massage actions during massage on local parts of human body.

SUMMARY

(I) Technical Problem

The purpose of the present invention is to provide a massager to solve the problem that the massagers of the prior art, in view of their integrated massage functions, can only perform one action through a single motor, resulting in low massage comfort and poor combination of massage actions for human body.

(II) Technical Solution

In order to achieve the above purpose, the present disclosure provides the following technical solution:

a massager, comprising a main body, a power mechanism and a linear reciprocating mechanism mounted on the main body, wherein the power mechanism drives the linear reciprocating mechanism to reciprocate linearly; the main body comprises a massage chamber, wherein the massage chamber is provided with a flexible massage mechanism for accommodating an inserted part of human body, and the linear reciprocating mechanism drives the flexible massage mechanism to reciprocate and rotate to massage the inserted part of human body.

Preferably, the power mechanism comprises a driving case, a first gear rotatably mounted on the driving case, and a second gear and a third gear engaged with the first gear concurrently, wherein the first gear has a first axis, the second gear and the third gear coaxially have a second axis, and the first axis is perpendicular to the second axis; and the driving case is provided with a drive motor connected to the first gear.

Preferably, the main body comprises a sliding bracket, and the flexible massage mechanism comprises at least a first massage member, a second massage member and a third massage member, wherein the first massage member and the second massage member are slidably mounted on the sliding bracket, the third massage member is rotatably mounted on the sliding bracket, and the first gear is connected to the third massage member; the linear reciprocating mechanism comprises a first reciprocating swing assembly and a second reciprocating swing assembly, wherein the first reciprocating swing assembly is connected to the second gear and pulls the first massage member to slide in a reciprocating manner, and the second reciprocating swing assembly is connected to the third gear and pulls the second massage member to slide in a reciprocating manner.

Preferably, all the first gear, the second gear and the third gear are bevel gears.

Preferably, the first gear is a crown gear, and the second gear and the third gear are spur gears; or the first gear is a spur gear, and the second gear and the third gear are crown gears.

Preferably, the first reciprocating swing assembly comprises a first crank mounted on the second gear, wherein the first crank has a first eccentric column, wherein a first connecting rod is rotatably mounted on the first eccentric column, wherein the end of the first connecting rod is rotatably connected to a first slide rod, and the first slide rod slides through the end of the sliding bracket and is connected to the first massage member.

Preferably, the second reciprocating swing assembly comprises a second crank mounted on a third gear, wherein the second crank has a second eccentric column, wherein a second connecting rod is rotatably mounted on the second eccentric column, wherein the end of the second connecting rod is rotatably connected to a second slide rod, and the second slide rod slides through the end of the sliding bracket and is connected to the second massage member.

Preferably, the first eccentric column and the second eccentric column are in the same axis; or the first eccentric column and the second eccentric column are arranged at a 90° offset; or the first eccentric column and the second eccentric column are arranged at a 180° offset.

Preferably, each of the first massage member and the second massage member comprises a ring frame and a flexible massage ring embedded in the ring frame, wherein each of the flexible massage rings is provided with a plurality of convex points at intervals on the inner wall, and a vibration motor is embedded in each of the flexible massage rings; and the ring frames are slidably mounted on the sliding bracket.

Preferably, each of the first massage member and the second massage member comprises a rubbing bracket of an arc structure and a flexible massage part embedded in the rubbing bracket, wherein each of the flexible massage parts is provided with an arc opening, with a plurality of convex points at intervals on the inner wall, and with a vibration motor in the front therein; and the rubbing brackets are mounted on the sliding bracket.

Preferably, the third massage member comprises a rotating frame rotatably mounted on the sliding bracket, wherein a silicone brush is embedded in the rotating frame, and a plurality of flexible columns extending toward one side of the first massage member are arranged in an array on the silicone brush.

Preferably, the massager comprises a housing and a lid, wherein the sliding bracket and the driving case are mounted in the housing, the driving case is integrated with a control circuit board and a button module, and the buttons of the button module are exposed on the housing; a buffer flexible ring is provided at the opening of the housing, and is connected to the internal space of the sliding bracket; and the lid is buckled on the housing and presses the buffer flexible ring.

Preferably, the sliding bracket comprises a first annular bracket and a second annular bracket, wherein a plurality of sliding guide rods evenly distributed circumferentially are fixed between the first annular bracket and the second annular bracket.

Preferably, each of the first massage member and the second massage member is provided with a plurality of sliding parts evenly distributed circumferentially, wherein the sliding parts are provided with sliding holes, and the sliding holes are slidably matched with corresponding sliding guide rods.

Preferably, two of the sliding holes are provided with snap-fit openings, and the opening size of each snap-fit opening is smaller than the diameter of the sliding guide rod.

Preferably, sealing grooves are provided at intervals on the outer peripheral wall of the first annular bracket, and a sealing ring is provided in each sealing groove.

Preferably, a ring case structure protruding toward one side of the driving case is provided inside the first annular bracket, and the ring case structure has a receiving cavity, wherein the third massage member is in the receiving cavity.

Preferably, each of the first massage member and the second massage member is provided with a pressing member, wherein the sliding end of the first reciprocating swing assembly is fixed to the pressing member of the first massage member, and the sliding end of the second reciprocating swing assembly is fixed to the second massage member.

(III) Beneficial Effects

The power mechanism and the linear reciprocating mechanism enable the flexible massage mechanism to reciprocate and rotate to stimulate the human body, thereby forming a combination of massage actions. Specifically, the first gear, the second gear and the third gear are mounted through the driving case; when the first gear rotates, the second gear and the third gear rotate synchronously, wherein the first gear drives the third massage member to rotate, the second gear pulls the first massage member to reciprocate relative to the sliding bracket through the first reciprocating swing assembly, and the third gear pulls the second massage member to reciprocate relative to the sliding bracket through the second reciprocating swing assembly; and only the first gear needs to be connected to the drive motor;

This design realizes a single power source to enable the first massage member and the second massage member to perform reciprocating and sliding massage on the human body, and the third massage member to perform contact massage on the human body synchronously, that is to say, it realizes driving three massage members simultaneously by one power source; among them, the first massage member and the second massage member can slide relative to each other, to form a variety of sliding massage modes for the part of human body to be massaged, forming a combination of massage actions;

The relative sliding of the first massage member and the second massage member makes sure that the inserted part of human body can be massaged even at a shallow depth, thereby improving the comfort of the part of human body being massaged.

BRIEF DESCRIPTION OF THE DRAWINGS

In FIG. 1 to FIG. 12, the relationship between the component names or lines and the numbers in the figures is as follows sliding bracket 1, first annular bracket 101, second annular bracket 102, sliding guide rod 103, sealing groove 104, ring case structure 105, first massage member 2, second massage member 3, third massage member 4, rotating frame 41, silicone brush 42, flexible column 43, driving case 5, first gear 6, second gear 7, third gear 8, first reciprocating swing assembly 9, first crank 91, first eccentric column 92, first connecting rod 93, first slide rod 94, drive motor 10, second reciprocating swing assembly 11, second crank 111, second eccentric column 112, second connecting rod 113, second slide rod 114, ring frame 12, flexible massage ring 13, convex point 14, vibration motor 15, rubbing bracket 16, flexible massage part 17, arc opening 18, housing 19, lid 20, control circuit board 21, button module 22, buffer flexible ring 24, sliding portion 25, sliding hole 250, snap-fit opening 251, pressing member 26.

DETAILED DESCRIPTION

The technical solutions in the embodiment of the present disclosure will be clearly and completely described below with reference to the drawings in the embodiment of the present disclosure. Obviously, the embodiment described is only a part of, not all, the embodiments of the present disclosure.

As shown in FIG. 1 to FIG. 4, a massager is provided as the embodiment of the present disclosure, comprising a main body, a power mechanism and a linear reciprocating mechanism mounted on the main body, wherein the power mechanism drives the linear reciprocating mechanism to reciprocate linearly; the main body comprises a massage chamber, wherein the massage chamber is provided with a flexible massage mechanism for accommodating an inserted part of human body, and the linear reciprocating mechanism drives the flexible massage mechanism to reciprocate and rotate to massage the inserted part of human body, wherein the power mechanism and the linear reciprocating mechanism, in addition to using a screw mechanism or a spiral mechanism, can also use the specific driving method provided in this embodiment, as detailed in the following description, and the main purpose is to realize a combination of massage actions that allows the flexible massage mechanism to perform sliding and rotating actions synchronously. When it is used to massage a certain part of human body (such as the penis and a finger), the part of human body is usually inserted into the flexible massage mechanism of the massager, and then the power mechanism and the linear reciprocating mechanism drive the flexible massage mechanism to realize a combination of reciprocating and rotating massage actions on the part of human body, so as to relieve physical and mental fatigue for relaxation of the part of human body. However, The massagers of the prior art can perform only one massage action in massage, and are not adaptable to different insertion depths of the inserted part of human body during actual massage. In view of this problem, the embodiment of the disclosure provides a new massager to improve massage comfort, increase the combination of massage actions, and meet the requirement that massage can be achieved under different insertion depths of the part of human body.

Figure 4:
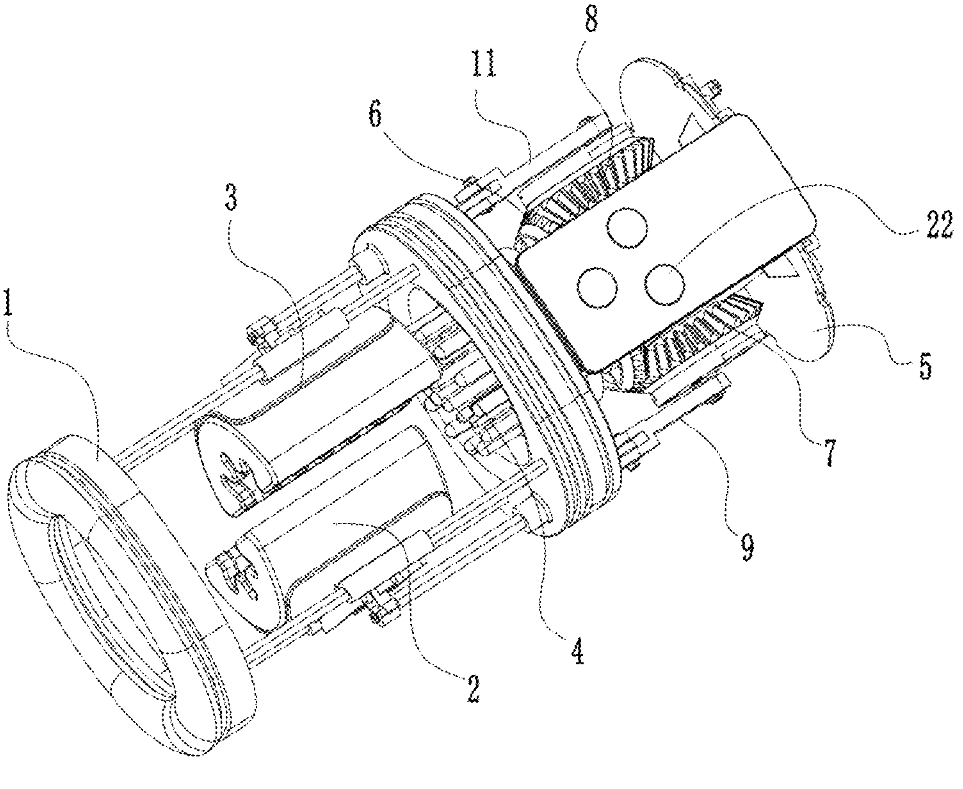
FIG. 4 is a schematic diagram of the spatial structure of a third embodiment method for the present disclosure.
Figure 11:
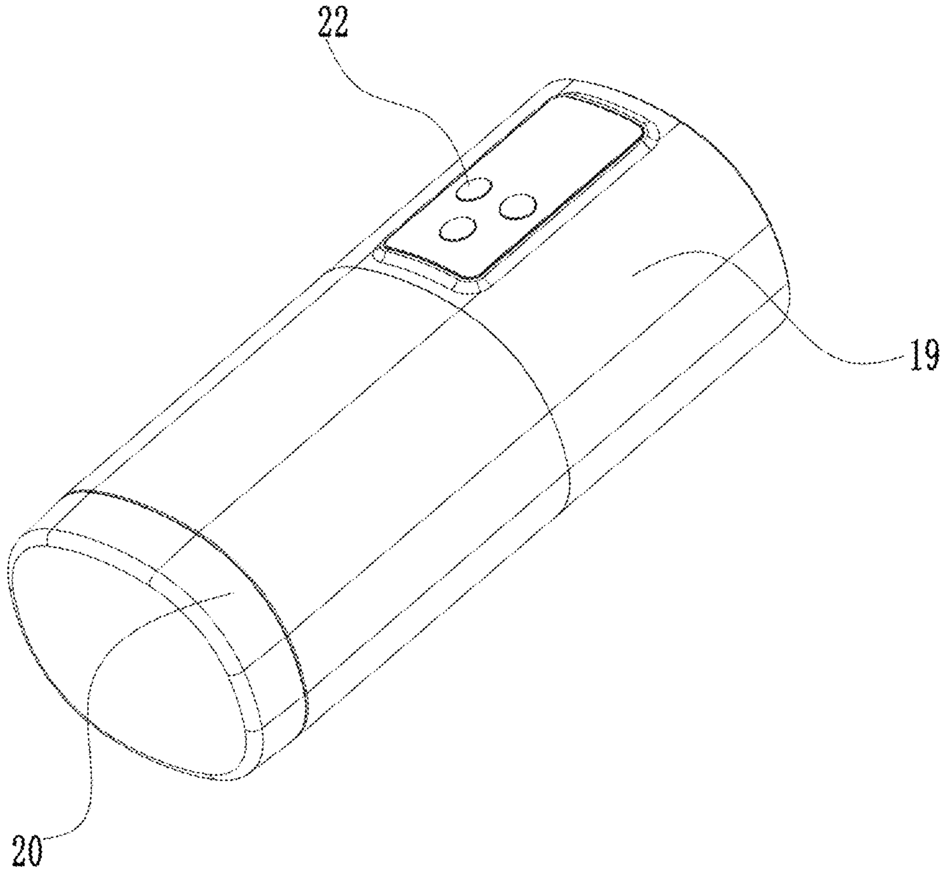
FIG. 11 is a schematic structural diagram of the massager of the present disclosure.
Figure 12:
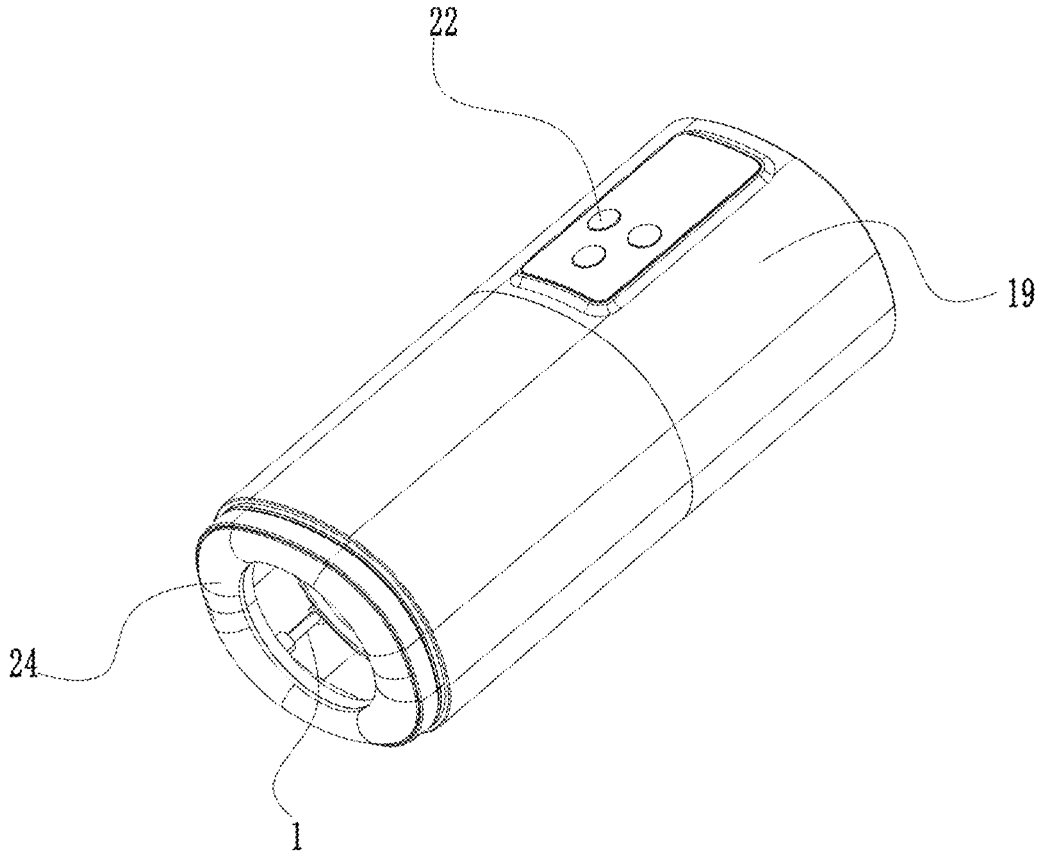
FIG. 12 is a schematic diagram of the structure of the massager of the present disclosure with the lid removed.

Specifically, as shown in FIG. 11 and FIG. 12, the main body includes a housing 19 and a lid 20, wherein a sliding bracket 1 and a driving case 5 are integrated in the housing 19, wherein a first massage member 2 and a second massage member 3 are slidably mounted on the sliding bracket 1, and a third massage member 4 is rotatably mounted on the sliding bracket 1. As shown in FIG. 4, the sliding bracket 1 comprises a first annular bracket 101 and a second annular bracket 102, wherein a plurality of sliding guide rods 103 evenly distributed circumferentially are fixed between the first annular bracket 101 and the second annular bracket 102, and both the first massage member 2 and the second massage member 3 are slidably mounted on the plurality of sliding guide rods 103. This embodiment is provided with four sliding guide rods 103 to ensure that the first massage member 2 and the second massage member 3 slide stably, specifically, a plurality of sliding parts 25 evenly distributed circumferentially are provided on both the first massage member 2 and the second massage member 3, and the sliding parts 25 are provided with sliding holes 250, wherein the sliding holes 250 are slidably matched with corresponding sliding guide rods 103 to achieve sliding guide limit.

Furthermore, two of the sliding holes 250 are provided with snap-fit openings 251, and the opening size of each snap-fit opening 251 is smaller than the diameter of the sliding guide rod 103, for convenience of snap-fit positioning during assembly, so as to improve the assembly efficiency.

After the sliding bracket 1 is mounted in the housing 19, it is necessary to seal the massage part for isolation with the electrical part, and the first annular bracket 101 serves as the structure for isolating the massage part and the electrical part. Sealing grooves 104 are provided at intervals on the outer peripheral wall of the first annular bracket 101, and a sealing ring is provided in each sealing groove 104, to seal the contact surface.

Figure 5:
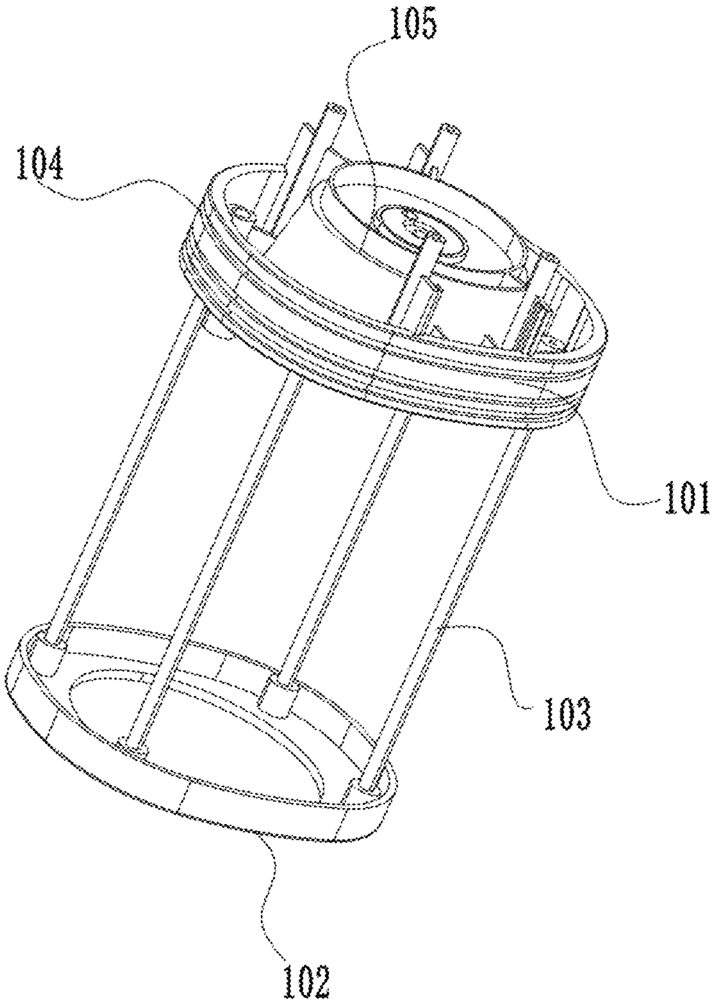
FIG. 5 is a schematic diagram of the spatial structure of the sliding bracket of the present disclosure.

Furthermore, as shown in FIG. 5, an ring case structure 105 protruding toward one side of the driving case 5 is provided inside the first annular bracket 101. The ring case structure 105 has a receiving cavity, and the third massage member 4 is located in the receiving cavity. The ring case 105 is used to further isolate the massage part and the electrical part, and the third massage member 4 is mounted on the ring case 105, so as to accommodate the third massage member 4 that specifically performs the massage action into the receiving cavity. Thus, the first massage member 2, the second massage member 3 and the third massage member 4 that specifically perform the massage action are completely isolated from the electrical part, to avoid any liquid that is present during massage from flowing into the electrical part.

Among them, the first massage member 2 and the second massage member 3 slide independently relative to the sliding bracket 1 to perform sliding massage on the inserted part of human body, and the third massage member 4 performs rotating massage but not rotary sweeping massage to the human body. In the specific massage process, the first massage member 2, the second massage member 3 and the third massage member 4 work simultaneously to form a combination of massage actions, thereby improving massage comfort.

As shown in FIG. 1 to FIG. 4, the power mechanism comprises a driving case, wherein the main body comprises a sliding bracket 1, and the flexible massage mechanism comprises at least a first massage member 2, a second massage member 3 and a third massage member 4. Specifically, a driving case 5 is mounted on the sliding bracket 1, wherein a first gear 6 is rotatably mounted on the driving case 5, as well as a second gear 7 and a third gear 8 engaged with the first gear 6 concurrently; the first gear 6 has a first axis, the second gear 7 and the third gear 8 coaxially have a second axis, and the first axis is perpendicular to the second axis, wherein the first gear 6 is connected to the third massage member 4, the second gear 7 is provided with a first reciprocating swing assembly 9 connected to the first massage member 2, wherein the first reciprocating swing assembly 9 pulls the first massage member 2 to slide in a reciprocating manner; the third gear 8 is provided with a second reciprocating swing assembly 11 connected to the second massage member 3, wherein the second reciprocating swing assembly 11 pulls the second massage member 3 to slide in a reciprocating manner; and furthermore, a drive motor 10 connected to the first gear 6 is mounted in the driving case 5. When a driving motor 10 rotates, it drives the first gear 6 to rotate, and the second gear 7 and the third gear 8 rotate synchronously, wherein the first gear 6 drives the third massage member 4 to rotate to perform sweeping massage, the second gear 7 rotates to drive the first massage member 2 to reciprocate relative to the sliding bracket 1 through the first reciprocating swing assembly 9, and the third gear 8 rotates to drive the second massage member 3 to reciprocate relative to the sliding bracket 1 through the second reciprocating swing assembly 11. In this way, the first massage member 2 and the second massage member 3 perform relative sliding independently, and multiple possibilities such as co-directional sliding, reverse sliding or asynchronous sliding can be realized, to form a combination of massage actions that meets the comfort requirements.

In order to further ensure the connection reliability when the first massage member 2 and the second massage member 3 are driven and pulled, a pressing member 26 is provided on each of the first massage member 2 and the second massage member 3, wherein the sliding end of the first reciprocating swing assembly 9 is fixed on the pressing member 26 of the first massage member 2, and the sliding end of the second reciprocating swing assembly 11 is fixed on the second massage member 3, to achieve reliable connection of the connected parts by the pressing members 26, so that there is no risk of slippage during reciprocation.

In addition, since the first massage member 2 is close to the end from which the part of human body is inserted into the massager and the first massage member 2 has a moving stroke close to the insertion end relative to the second massage member 3, a shallower insertion of the part of human body can also ensure that the first massage member 2 performs massage, thereby being able to adapt to continuous massage with less changes in the insertion depth.

In addition, using a drive motor 10 as the power source realizes the combination of rotation and reciprocating sliding at the same time, which can further reduce the volume of the power mechanism, to facilitate a smaller volume of the entire massager, and make it easy to carry.

Furthermore, as it is necessary to control the internal drive motor 10 from outside the housing 19, the driving case 5 is integrated with a control circuit board 21 and a button module 22, and the buttons of the button module 22 are exposed on the housing 19, which can be used to control the internal button module 22, and the control circuit board 21 can be used to control the action of the internal electrical part, for which the specific circuit principle of prior art is adopted.

The entire massager performs massage on a specific part of human body inserted from the opening of the housing 19. In specific use, it is necessary to protect the inserted part of human body during such insertion and form a pressure buffer during massage. Specifically, a buffer flexible ring 24 is provided at the opening of the housing 19, wherein the buffer flexible ring 24 is connected to the internal space of the sliding bracket 1, the buffer flexible ring 24 is used to protect the part of human body at the opening.

The lid 20 is buckled on the housing 19 and presses the buffer flexible ring 24 to protect the internal massage space and avoid the entry of impurities, which otherwise will produce a foreign body sensation when the part of human body is being massaged.

Figure 1:
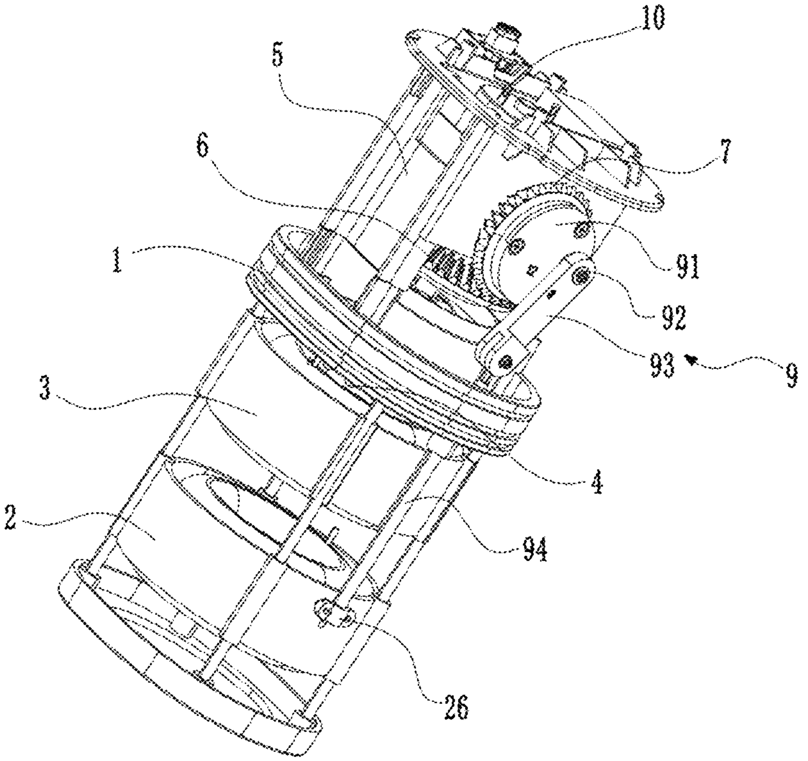
FIG. 1 is a schematic diagram of the spatial structure of a first embodiment method for the present disclosure from a first perspective.
Figure 2:
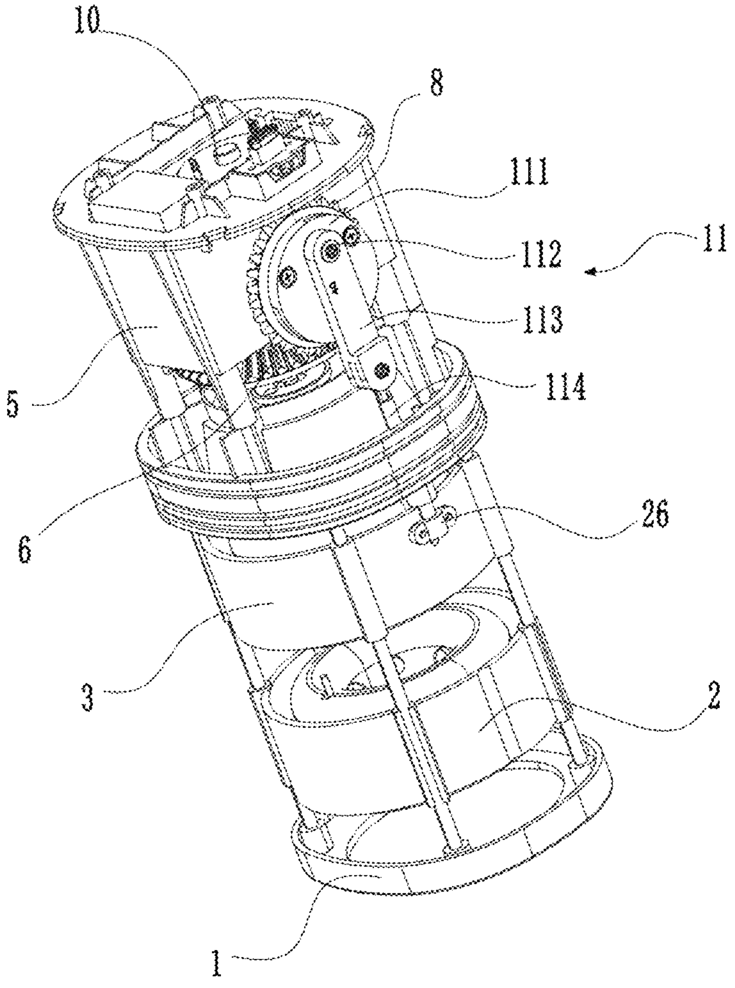
FIG. 2 is a schematic diagram of the spatial structure of a first embodiment method for the present disclosure from a second perspective.
Figure 3:
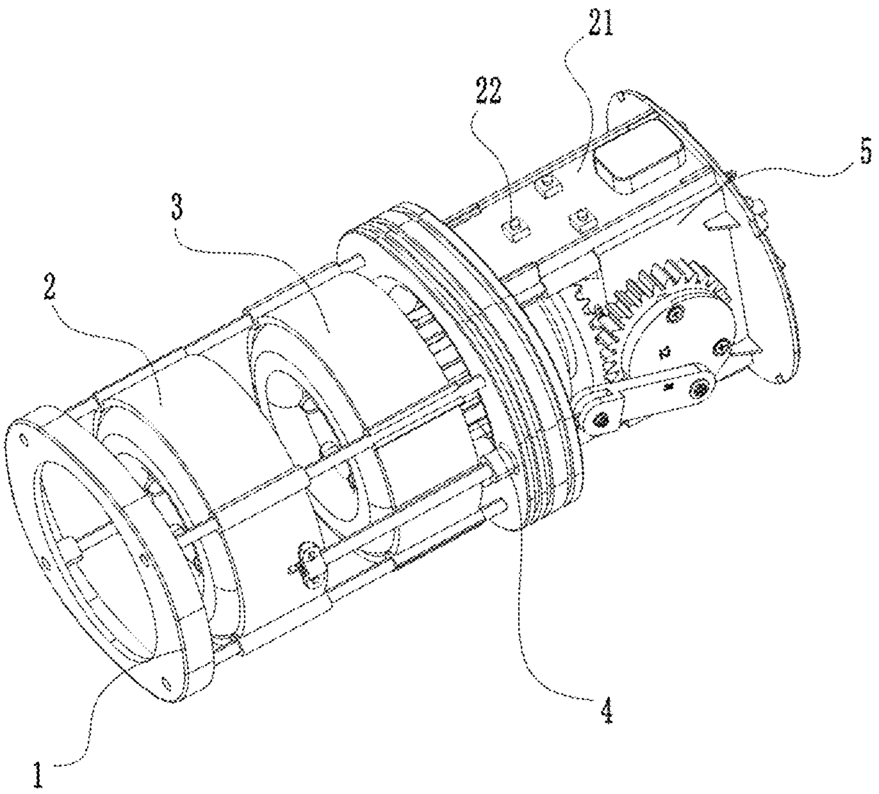
FIG. 3 is a schematic diagram of the spatial structure of a second embodiment method for the present disclosure.
Figure 6:
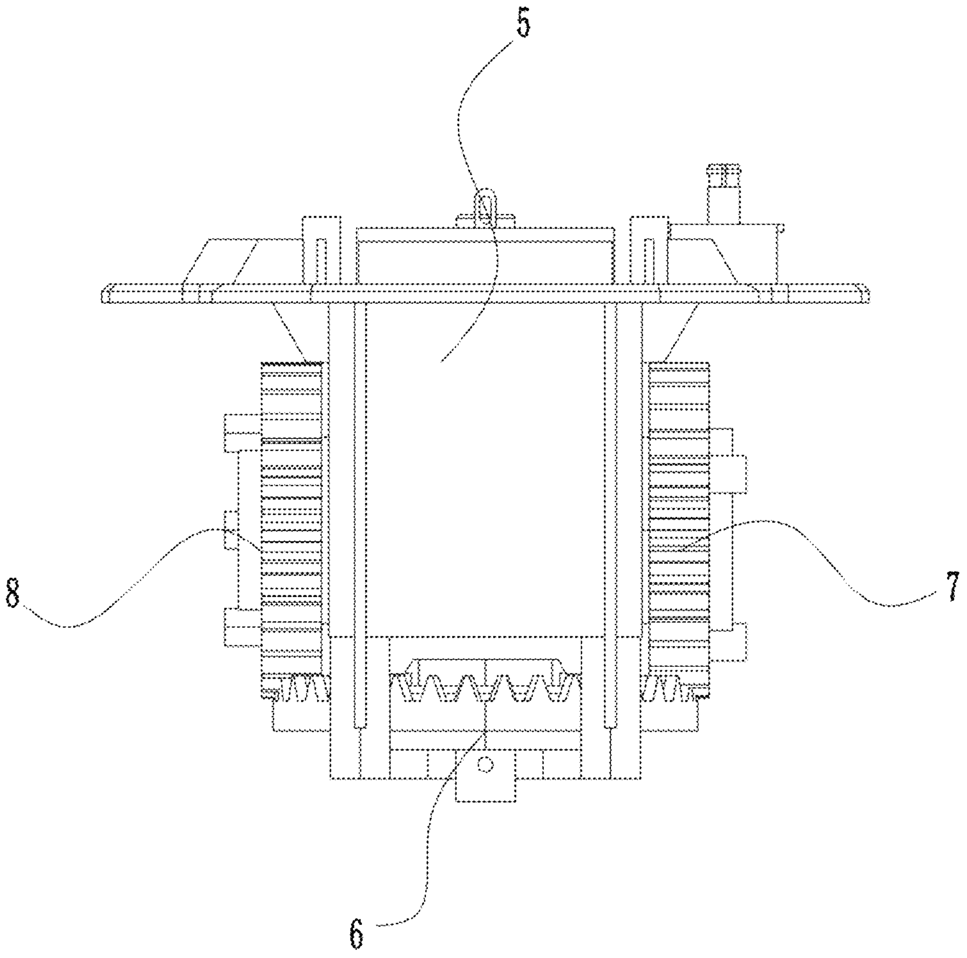
FIG. 6 is a schematic diagram of the structure of a second drive mechanism of the present disclosure.
Figure 7:
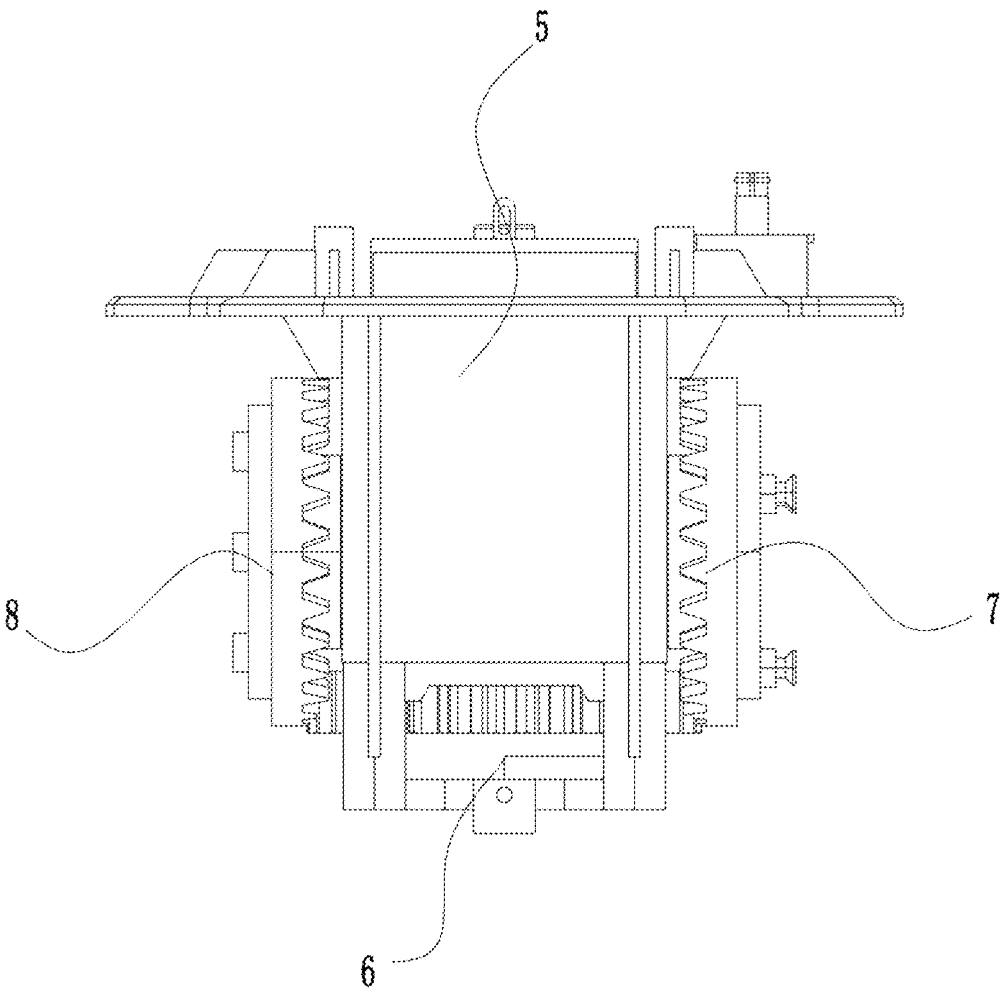
FIG. 7 is a schematic diagram of the structure of a third drive mechanism of the present disclosure.

Specifically, during massage, the first gear 6 drives the second gear 7 and the third gear 8 to rotate at the same time, and the first axis of the first gear 6 is perpendicular to the second axis of the second gear 7 and the third gear 8, so that it is necessary to be able to convert the rotation direction. As shown in FIG. 1 and FIG. 2, in one embodiment method, all the first gear 6, the second gear 7 and the third gear 8 can be bevel gears. Or a second embodiment method can also be adopted, as shown in FIG. 6, in which the first gear 6 is a crown gear, and the second gear 7 and the third gear 8 are spur gears; or a third embodiment method can also be adopted, as shown in FIG. 7, in which the first gear 6 is a spur gear, and the second gear 7 and the third gear 8 are crown gears. Therefore, this embodiment method is provided only to describe the method for converting the rotation direction of the first gear 6 to the rotation direction of the second gear 7 and the third gear 8. In addition to the three embodiment methods mentioned above, other methods that can be used to realize the conversion of rotation direction should also be considered within the protection scope of this embodiment.

Among them, the first massage member 2 is pulled by the first reciprocating swing assembly 9, as shown in FIG. 1 to FIG. 4, the first reciprocating swing assembly 9 comprises a first crank 91 mounted on the second gear 7, wherein the first crank 91 has a first eccentric column 92, wherein a first connecting rod 93 is rotatably mounted on the first eccentric column 92, wherein the end of the first connecting rod 93 is rotatably connected to a first slide rod 94, and the first slide rod 94 slides through the end of the sliding bracket 1 and is connected to the first massage member 2. When the first crank 91 is driven by the second gear 7 to rotate, the first connecting rod 93 swings, thereby pulling the first slide rod 94 to slide on the sliding bracket 1 in a reciprocating manner, and the first slide rod 94 is fixed to the first massage member 2 through the pressing member 26, thereby making the first massage member 2 to reciprocate, wherein the reciprocating stroke of the first massage member 2 depends on the position of the first eccentric column 92.

Furthermore, the second massage member 3 is pulled by the second reciprocating swing assembly 11, the second reciprocating swing assembly 11 comprises a second crank 111 mounted on a third gear 8, wherein the second crank 111 has a second eccentric column 112, wherein a second connecting rod 113 is rotatably mounted on the second eccentric column 112, wherein the end of the second connecting rod 113 is rotatably connected to a second slide rod 114, and the second slide rod 114 slides through the end of the sliding bracket 1 and is connected to the second massage member 3. Similarly, the second connecting rod 113 is driven by the second crank 111 to swing, so that the second slide rod 114 slides relative to the sliding bracket 1, wherein the second slide rod 114 is fixed to the second massage member 3 through the pressing member 26. Similarly, the reciprocating stroke of the second massage member 3 depends on the position of the second eccentric column 112.

Specifically, when the first massage member 2 and the second massage member 3 are driven to perform sliding massage, different action modes can be achieved by adjusting the relative positions of the first eccentric column 92 and the second eccentric column 112. When the first eccentric column 92 and the second eccentric column 112 are on the same axis, which means that they are on the same axis in the initial state, the first massage member 2 and the second massage member 3 reciprocate synchronously in the same direction when the two eccentric columns are moving. When the first eccentric column 92 and the second eccentric column 112 are arranged at a 90-degree offset in the initial state, the first massage member 2 or the second massage member 3 will side in an alternate manner when the two eccentric columns are moving, in which the two massage members slide in opposite directions during a part of the stroke and in the same direction during most of the stroke. When the first eccentric column 92 and the second eccentric column 112 are arranged 180° offset in the initial state, the first massage member 2 and the second massage member 3 completely slide in opposite directions when the two eccentric columns are moving. In this way, it is possible to achieve different sliding modes by adjusting the angles between the first crank 91 and the second crank 111 when the first eccentric column and the second eccentric column 112 are mounted specifically.

Regardless of the sliding mode, the maximum spacing between the first massage member 2 and the second massage member 3 is 30 mm, to meet the safety and comfort requirements when a part of human body is massaged.

Figure 8:
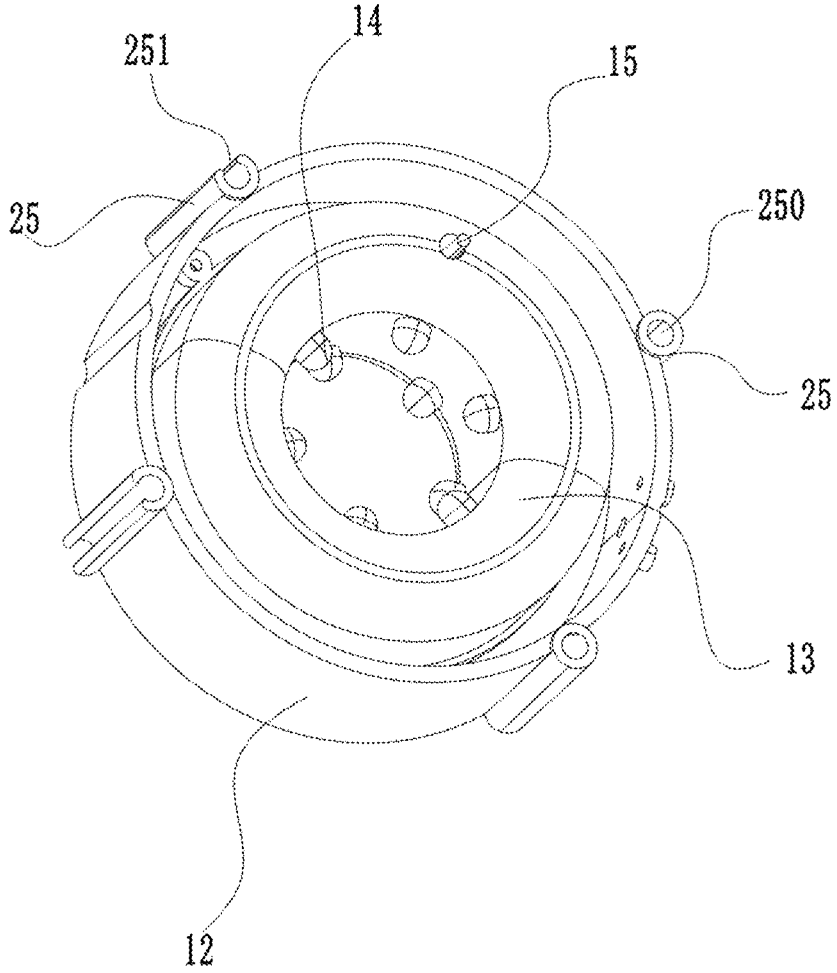
FIG. 8 is a schematic diagram of the structure of a first embodiment method for the first massage member and the second massage member of the present disclosure.

Specifically, the first massage member 2 and the second massage member 3 are of the same structure, but various embodiment methods can be formed according to the expected massage effect. In one embodiment method, as shown in FIG. 8, each of the first massage member 2 and the second massage member 3 comprises a ring frame 12 and a flexible massage ring 13 embedded in the ring frame 12, wherein each of the flexible massage rings 13 is provided with a plurality of convex points 14 at intervals on the inner wall, and the entire flexible massage rings 13 enfold the inserted part of human body to provide good sense of comfort during massage. Furthermore, the plurality of convex points 14 arranged inside perform stimulating massage on the inserted part of human body. In order to further enhance the vibration stimulation of the inserted part of human body, a vibration motor 15 is embedded in each of the flexible massage rings 13, and the vibration force is transmitted to the inserted part of human body through the flexible massage rings 13. The entire structure is slidably mounted on the sliding bracket 1 through the ring frame 12.

Figure 9:
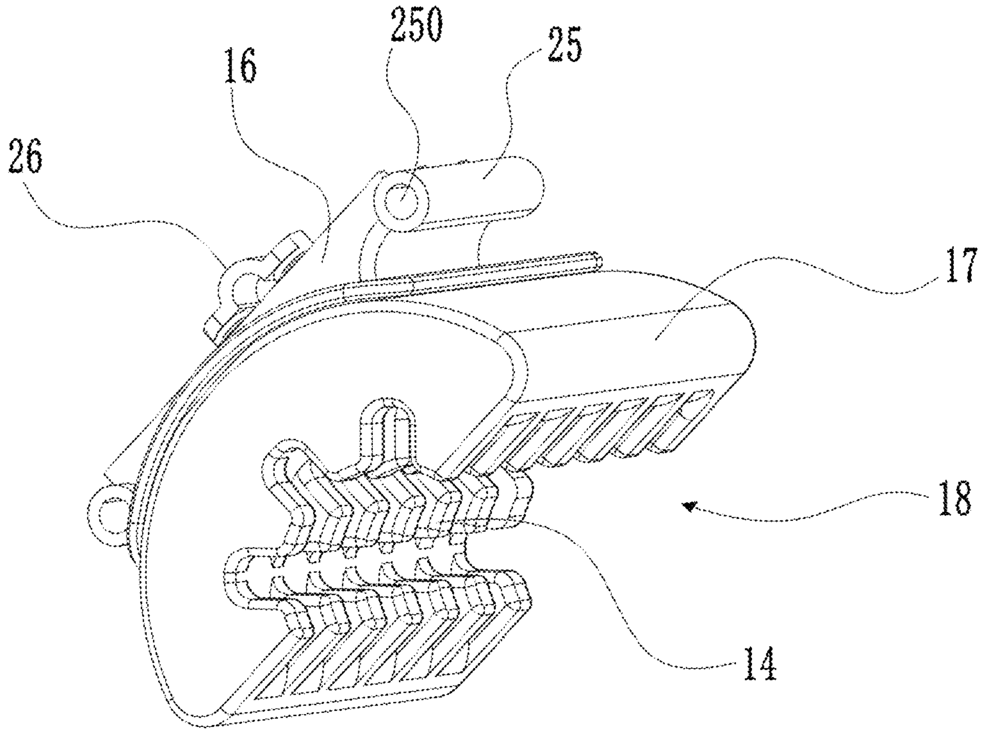
FIG. 9 is a schematic diagram of the structure of a second embodiment method for the first massage member and the second massage member of the present disclosure.

In another embodiment method, as shown in FIG. 9, each of the first massage member 2 and the second massage member 3 comprises a rubbing bracket 16 of an arc structure and a flexible massage part 17 embedded in the rubbing bracket 16, and each of the flexible massage parts 17 is provided with an arc opening 18. When this structure is adopted, the first massage member 2 and the second massage member 3 are arranged opposite to each other, so that the inserted part human body is contacted by the two relatively arranged flexible massage parts 17, the massage is achieved by sliding, and the arc openings 18 are adapted to increase the contact area with the inserted part of human body. Similarly, a plurality of convex points 14 are arranged at intervals on the inner wall of the flexible massage part 17 to increase stimulating massage during sliding, each of the flexible massage parts 17 is provided with a vibration motor 15 in the front therein to increase the vibrating stimulation force. The entire structure is mounted on the sliding bracket 1 through the rubbing bracket 16.

Since the vibration motor 15 needs to be conductive, it is necessary to guide wires from the control circuit board 21 to the vibration motors 15. Both the first slide rod 94 and the second slide rod 114 are made of stainless steel tubes with an inner diameter of 2.5 mm and an outer diameter of 4.5 mm, so that the wires can go through inside. Furthermore, the wires move synchronously with the first massage member 2 and the second massage member 3, so that the vibration motors 15 will not be separated from the wires. The wire for each vibration motor 15 is arranged independently, so that the wires will not be exposed at the connection position.

Figure 10:
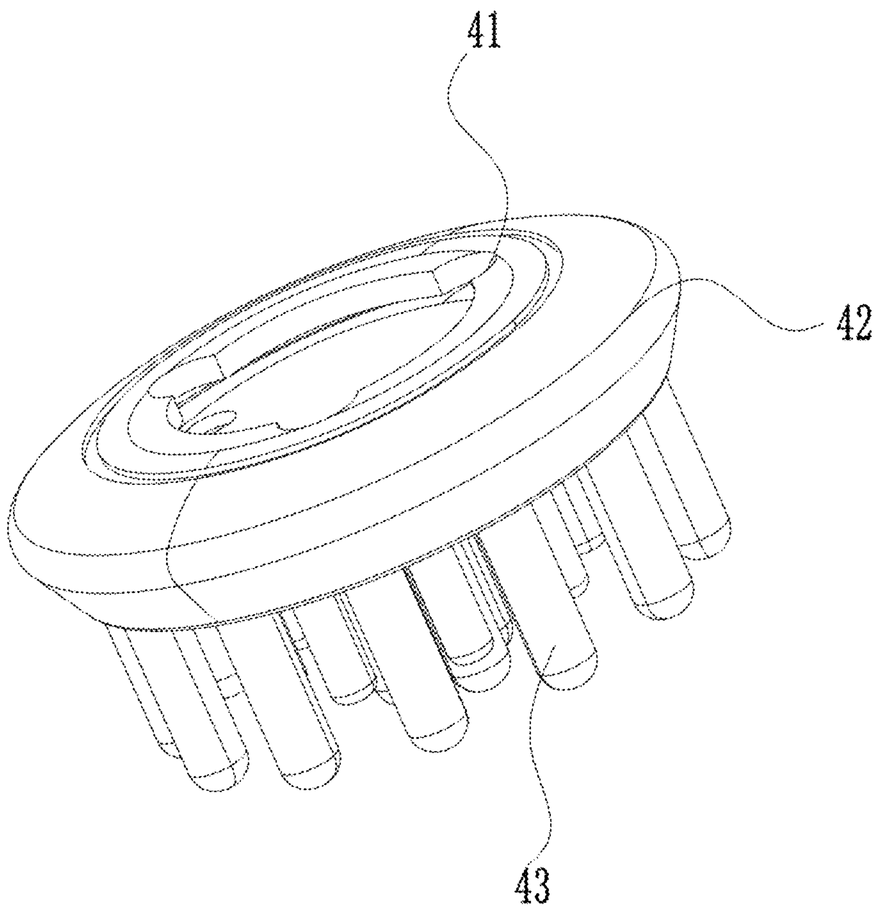
FIG. 10 is a schematic diagram of the structure of a third massage member of the present disclosure.

Specifically, the third massage member 4 will perform a rotary sweeping massage when rotating and the part contacting human body needs to be flexible. As shown in FIG. 10, the third massage member 4 comprises a rotating frame 41 rotatably mounted on the sliding bracket 1, wherein a silicone brush 42 is embedded on the rotating frame 41, and a plurality of flexible columns 43 extending toward one side of the first massage member 2 are arranged in an array on the silicone brush 42. The silicone brush 42 is driven to rotate by the rotating frame 41, and the extending flexible column 43 can perform sweeping massage on the inserted part of human body.

The flexible massage rings 13, the flexible massage part 17 and the silicone brush 42 that contact the human body are all connected in a nested manner to ensure that the parts that contact the human body are soft, and each specific structural part that realizes the transmission can adopt a hard structure to improve the comfort and safety of massage.

In the disclosure, unless otherwise specified or restricted, the terms of "installation", "interconnection", "connection" and "fixing" shall be understood as a general sense. For example, the connection can be fixed connection, removable connection, integrated connection, mechanical connection, electrical connection, direct connection, indirect connection through intermediate media, connection between two components or interaction between two components. Persons of ordinary skill in the art can understand the specific meanings of the above terms in the present disclosure as appropriate.

In the description of the invention, it needs to be noted that the azimuth or position relationships indicated by the terms "center", "upper", "lower", "left", "right", "inside" and "outside" are based on those shown in the drawings, or those in which a product of the invention is usually placed when used. It is only for convenience of description and simplification of the present utility model, not to indicate or imply that the referred devices or components must have a specific orientation, be constructed and operate in a specific orientation, and thus cannot be understood as limiting the present utility model. Furthermore, the terms "first" and "second" are used merely for distinguishing purposes and shall not be construed as indicating or implying relative importance.

It is obvious to those skilled in the art that the present invention is not limited to the details of the above exemplary embodiment, and can be implemented in other specific forms without departing from the spirit or basic features of the present invention. Therefore, no matter from which point of view, the embodiment should be regarded as exemplary and non-limiting. The scope of the present invention is defined by the claims rather than the above description, so it is intended to include all changes that fall within the meaning and scope of the equivalent elements of the claims in the present disclosure. Any reference numerals in the claims should not be regarded as limiting the claims involved.

What is claimed is:

1. A massager, comprising: a main body, a power mechanism and a linear reciprocating mechanism mounted on the main body, wherein the power mechanism drives the linear reciprocating mechanism to reciprocate linearly;

the main body comprises a massage chamber, wherein the massage chamber is provided with a flexible massage mechanism for accommodating an inserted part of human body, and the linear reciprocating mechanism drives the flexible massage mechanism to reciprocate and rotate to massage the inserted part of human body;

wherein the power mechanism comprises a driving case, a first gear rotatably mounted on the driving case, and a second gear and a third gear engaged with the first gear concurrently, wherein the first gear has a first axis, the second gear and the third gear coaxially have a second axis, and the first axis is perpendicular to the second axis; and the driving case is provided with a drive motor connected to the first gear;

wherein the main body comprises a sliding bracket, and the flexible massage mechanism comprises at least a first massage member, a second massage member and a third massage member, wherein the first massage member and the second massage member are slidably mounted on the sliding bracket, the third massage member is rotatably mounted on the sliding bracket, and the first gear is connected to the third massage member; and the linear reciprocating mechanism comprises a first reciprocating swing assembly and a second reciprocating swing assembly, wherein the first reciprocating swing assembly is connected to the second gear and pulls the first massage member to slide in a reciprocating manner, and the second reciprocating swing assembly is connected to the third gear and pulls the second massage member to slide in a reciprocating manner.

2. The massager according to claim 1, wherein all the first gear, the second gear and the third gear are bevel gears.

3. The massager according to claim 1, wherein the first gear is a crown gear, and the second gear and the third gear are spur gears; or the first gear is a spur gear, and the second gear and the third gear are crown gears.

4. The massager according to claim 1, wherein the first reciprocating swing assembly comprises a first crank mounted on the second gear, wherein the first crank has a first eccentric column;

wherein a first connecting rod is rotatably mounted on the first eccentric column, wherein an end of the first connecting rod is rotatably connected to a first slide rod, and the first slide rod slides through the end of the sliding bracket and is connected to the first massage member.

5. The massager according to claim 1, wherein the second reciprocating swing assembly comprises a second crank mounted on a third gear, wherein the second crank has a second eccentric column;

wherein a second connecting rod is rotatably mounted on the second eccentric column, wherein an end of the second connecting rod is rotatably connected to a second slide rod, and the second slide rod slides through the end of the sliding bracket and is connected to the second massage member.

6. The massager according to claim 5, wherein the first eccentric column and the second eccentric column are in the same axis; or the first eccentric column and the second eccentric column are arranged at a 90° offset; or the first eccentric column and the second eccentric column are arranged at a 180° offset.

7. The massager according to claim 1, wherein each of the first massage member and the second massage member comprises a ring frame and a flexible massage ring embedded in the ring frame, wherein each of the flexible massage rings is provided with a plurality of convex points at intervals on the inner wall, and a vibration motor is embedded in each of the flexible massage rings; and the ring frames are slidably mounted on the sliding bracket.

8. The massager according to claim 1, wherein each of the first massage member and the second massage member comprises a rubbing bracket of an arc structure and a flexible massage part embedded in the rubbing bracket, wherein each of the flexible massage parts is provided with an arc opening, with a plurality of convex points at intervals on the inner wall, and with a vibration motor in the front therein; and the rubbing brackets are mounted on the sliding bracket.

9. The massager according to claim 1, wherein the third massage member comprises a rotating frame rotatably mounted on the sliding bracket, wherein a silicone brush is embedded in the rotating frame, and a plurality of flexible columns extending toward one side of the first massage member are arranged in an array on the silicone brush.

10. The massager according to claim 1, wherein the main body comprises a housing and a lid, wherein the sliding bracket and the driving case are mounted in the housing, the driving case is integrated with a control circuit board and a button module, and the buttons of the button module are exposed on the housing;

a buffer flexible ring is provided at the opening of the housing, and is connected to the internal space of the sliding bracket; and the lid is buckled on the housing and presses the buffer flexible ring.

11. The massager according to claim 1, wherein the sliding bracket comprises a first annular bracket and a second annular bracket, wherein a plurality of sliding guide rods evenly distributed circumferentially are fixed between the first annular bracket and the second annular bracket.

12. The massager according to claim 11, wherein sealing grooves are provided at intervals on the outer peripheral wall of the first annular bracket, and a sealing ring is provided in each sealing groove.

13. The massager according to claim 11, wherein a ring case structure protruding toward one side of the driving case is provided inside the first annular bracket, and the ring case structure has a receiving cavity, wherein the third massage member is in the receiving cavity.

14. The massager according to claim 11, wherein each of the first massage member and the second massage member is provided with a pressing member, wherein the sliding end of the first reciprocating swing assembly is fixed to the pressing member of the first massage member, and the sliding end of the second reciprocating swing assembly is fixed to the second massage member.

15. The massager according to claim 1, wherein each of the first massage member and the second massage member is provided with a plurality of sliding parts evenly distributed circumferentially, wherein the sliding parts are provided with sliding holes, and the sliding holes are slidably matched with corresponding sliding guide rods.

16. The massager according to claim 15, wherein two of the sliding holes are provided with snap-fit openings, and the opening size of each snap-fit opening is smaller than the diameter of the sliding guide rod.

* * * * *